(12) United States Patent
Wei

(10) Patent No.: US 11,016,225 B2
(45) Date of Patent: May 25, 2021

(54) LENS MODULE

(71) Applicant: AAC Technologies Pte. Ltd., Singapore (SG)

(72) Inventor: Chuandong Wei, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 163 days.

(21) Appl. No.: 16/517,763

(22) Filed: Jul. 22, 2019

(65) Prior Publication Data

US 2020/0033513 A1 Jan. 30, 2020

(30) Foreign Application Priority Data

Jul. 24, 2018 (CN) .......................... 201821182061.4

(51) Int. Cl.
*G02B 5/00* (2006.01)
*G02B 13/18* (2006.01)

(52) U.S. Cl.
CPC .............. *G02B 5/003* (2013.01); *G02B 13/18* (2013.01)

(58) Field of Classification Search
CPC ........ G02B 5/003; G02B 13/18; G02B 5/005; G02B 7/021; G02B 7/022; G02B 13/0045; G02B 7/02; G02B 7/023; G02B 7/025; G02B 7/026
See application file for complete search history.

(56) References Cited

U.S. PATENT DOCUMENTS

| 9,874,715 | B1* | 1/2018 | Ma ......................... G02B 7/021 |
| 2014/0160581 | A1* | 6/2014 | Cho ......................... G02B 7/02 |
| | | | 359/738 |
| 2017/0003473 | A1* | 1/2017 | Zhan ........................ G02B 7/021 |
| 2017/0045735 | A1* | 2/2017 | Chou ................... G02B 27/0018 |
| 2019/0049689 | A1* | 2/2019 | Lin ..................... G02B 13/0045 |

* cited by examiner

*Primary Examiner* — Stephone B Allen
*Assistant Examiner* — Matthew Y Lee
(74) *Attorney, Agent, or Firm* — IPro, PLLC; Na Xu

(57) ABSTRACT

The present disclosure provides a lens module comprising a lens barrel, a lens group, a light shielding plate and a first light shielding sheet received in the lens barrel, the lens barrel comprises a first barrel wall and a second barrel wall, the lens group comprises a first lens disposed away from the first barrel wall and a second lens, the light shielding plate is located between the first lens and the second lens, the second barrel wall comprises an annular groove provided in an inner wall thereof, the light shielding plate is partly received in the groove, the light shielding plate comprises a top surface adjacent to the object side, the top surface partly supports the second lens, the light shielding plate, the second lens and the groove jointly form an accommodation space, and the first light shielding sheet is completely received in the accommodation space.

12 Claims, 6 Drawing Sheets

LENS MODULE

TECHNICAL FIELD

The present disclosure relates to the field of optical imaging, and more particularly to a lens module.

BACKGROUND

Recently, with the continuous development of science and technology, electronic devices are constantly developed towards intelligentization. In addition to digital cameras, portable electronic devices such as tablet computers and mobile phones are also equipped with lens modules having camera functions so as to satisfy with users' needs of taking photos at any time.

A lens module of the prior art comprises a lens barrel, lenses disposed in the lens barrel, and a light shielding sheet and a light shielding plate sandwiched between the lenses.

However, in the prior art, when the difference between outer diameters of two adjacent lenses is too big, the mechanical properties of the light shielding plate are unstable due to the big difference in outer diameters, and the gap between the adjacent two lenses is likely to change significantly, which affects the stability of the lens module.

Therefore, it is necessary to provide an improved lens module to solve the above problems.

BRIEF DESCRIPTION OF THE DRAWINGS

In order to illustrate the technical solutions in the embodiments of the present disclosure more clearly, the drawings for in the description of the embodiments will be briefly described below. It is obvious that the drawings in the following description only illustrate some embodiments of the present disclosure. To those skilled in the art, other drawings could be obtained according to these drawings without any creative work, wherein.

DETAILED DESCRIPTION

The technical solutions in the embodiments of the present disclosure will be clearly and completely described in conjunction with the drawings in the embodiments of the present disclosure. It is obvious that the described embodiments are just a part but not all of the embodiments of the present disclosure. All other embodiments obtained by those skilled in the art based on the embodiments of the present disclosure without creative efforts would fall within the scope of the present disclosure.

Figure 1:
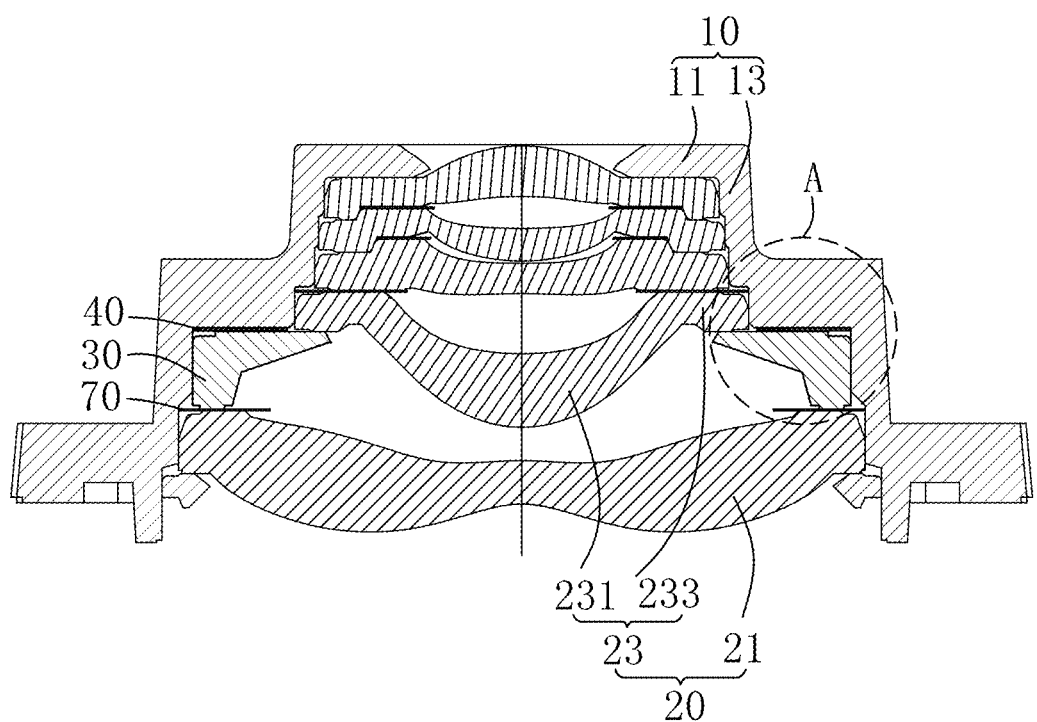
FIG. 1 is a structural diagram of a lens module according to an embodiment of the present disclosure.
Figure 2:
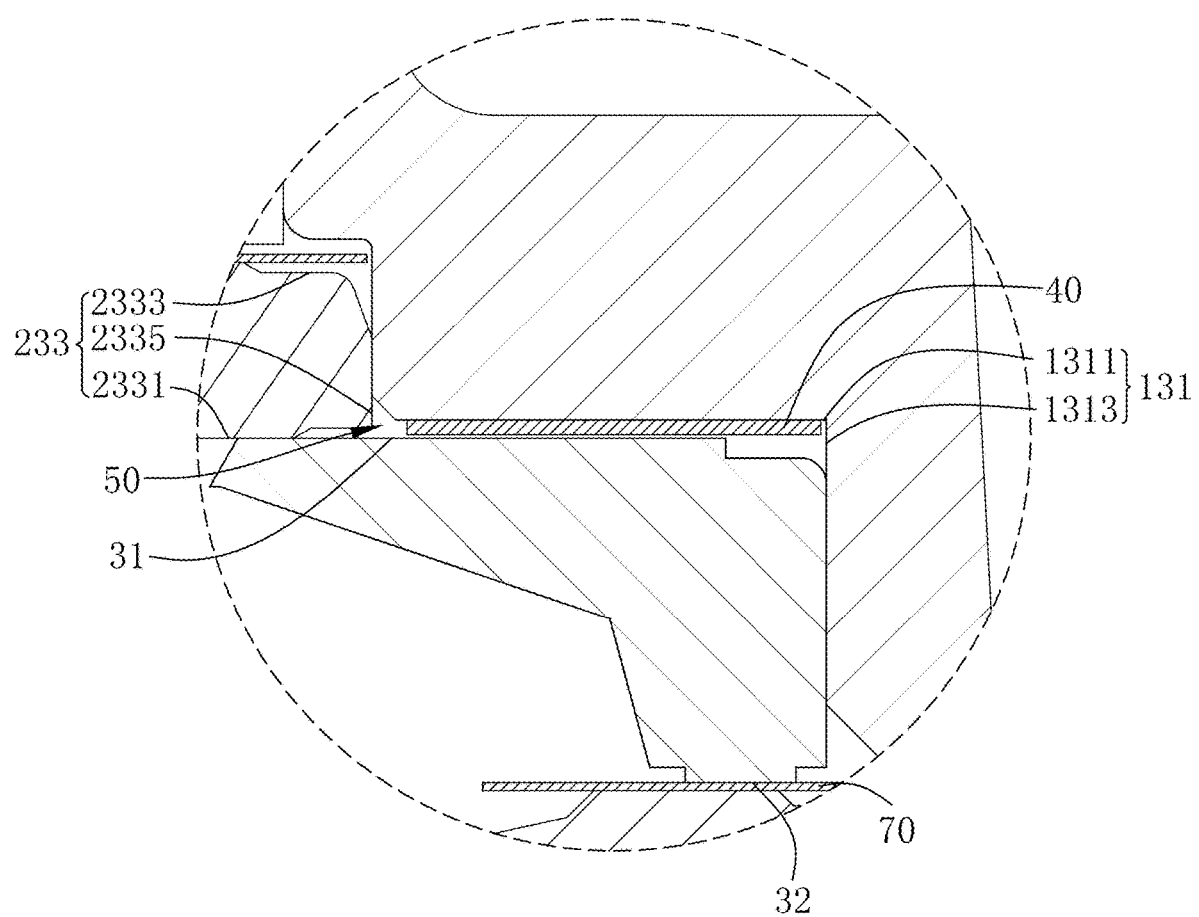
FIG. 2 is a partial enlarged view of area A shown in FIG. 1.

Referring to FIG. 1 and FIG. 2, the present disclosure provides a lens module 100 comprising a lens barrel 10, a lens group 20, a light shielding plate 30, and a first light shielding sheet 40 received in the lens barrel 10.

The lens barrel 10 comprises a first barrel wall 11 having a light through hole and a second barrel wall 13 crookedly extending from the first barrel wall 11.

The first barrel wall 11 and the second barrel wall 13 jointly form a receiving space for receiving the lens group 20, the light shielding plate 30 and the first light shielding sheet 40.

The second barrel wall 13 comprises an annular groove 131 provided in an inner wall thereof.

The light shielding plate 30 is partly received in the groove 131.

The groove 131 comprises a second surface 1311 perpendicular to an optical axis of the lens module 100 and a first surface 1313 crookedly extending from an end of the second surface 1311 away from the optical axis in a direction away from an object side.

The lens group 20 comprises a first lens 21 away from the first barrel wall 11 and a second lens 23 located between the first lens 21 and the first barrel wall 11.

The light shielding plate 30 is located between the first lens 21 and the second lens 23.

It should be noted that the lens module 100 of the present disclosure is not limited to a five-lens structure. The present embodiment is illustrated by taking five lenses as an example only, where the first lens 21 and the second lens 23 may be made of plastic or glass. While, it will be understood that the first lens 21 and the second lens 23 provided in the lens barrel 10 in the present embodiment are not limited to two lenses adjacent to the image side, two adjacent lenses could be taken as the first lens 21 and the second lens 23 in the present embodiment as long as there is a big difference between the outer diameters of the two adjacent lenses. That is to say, in other embodiments, if the differences among the outer diameters of three adjacent lenses are big, two sets of structures in this embodiment may be provided among the above three lenses.

The second lens 23 comprises a body portion 231 for imaging and a supporting portion 233 extending around the body portion 231.

The supporting portion 233 comprises an image side surface 2331 adjacent to the image side, an object side surface 2333 adjacent to the object side, and a side wall 2335 for connecting the image side surface 2331 and the object side surface 2333.

The side wall 2335 abuts against a side of the second barrel wall 13 adjacent to the optical axis.

The light shielding plate 30 is a light-shielding component having an annular structure, and the light shielding plate 30 is configured to shield and absorb the scattered light on one hand, and ensure a gap between the first lens 21 and the second lens 23 as well as the assembly stability on the other hand.

The light shielding plate 30 comprises a top surface 31 adjacent to the object side and a bottom surface 32 opposite to the top surface 31.

Additionally, a third light shielding sheet 70 is provided between the light shielding plate 30 and the first lens 21, and the third light shielding sheet 70 and the bottom surface 32 abut against each other.

The top surface 31 partly supports the second lens 23, such that a better effect for fixing the second lens 23 is obtained.

Specifically, the top surface 31 partly supports the image side surface 2331.

The light shielding plate 30, the second lens 23 and the groove 131 jointly form an accommodation space 50.

The first light shielding sheet 40 is completely received in the accommodation space 50.

The first light shielding sheet 40 has an annular structure and has an inner diameter larger than an outer diameter of the second lens 23.

Specifically, the first light shielding sheet 40 abuts against the second surface 1311 and is disposed opposite to and apart from the top surface 31, and the first light shielding sheet 40 and the first surface 1313 are spaced apart.

The interval distance between the first light shielding sheet 40 and the top surface 31 is between 0.001 mm and 0.02 mm.

A certain space is left between the first light shielding sheet 40 and the light shielding plate 30 before assembly, and a pressure produced during assembly causes the light shielding plate 30 to adhere closely to the first light shielding sheet 40 and press the second lens 23 as well.

The first light shielding sheet 40 is fixed on the second barrel wall 13, however, the thickness of the first light shielding sheet 40 could be selected during manufacture, so that the space between the first light shielding sheet 40 and the light shielding plate 30 could be adjusted.

It will be understood that such arrangement may make the light shielding plate 30 to be stably supported in terms of mechanics, and the interval distance between the first light shielding plate 40 and the top surface 31 could be controlled by changing the thickness of the first light shielding plate 40, such that the gap between the first lens 21 and the second lens 23 could be controlled. That is, the purpose of quickly controlling the gap between the first lens 21 and the second lens 23 could be achieved by replacing the first light shielding sheets 40 with different thicknesses.

Figure 3:
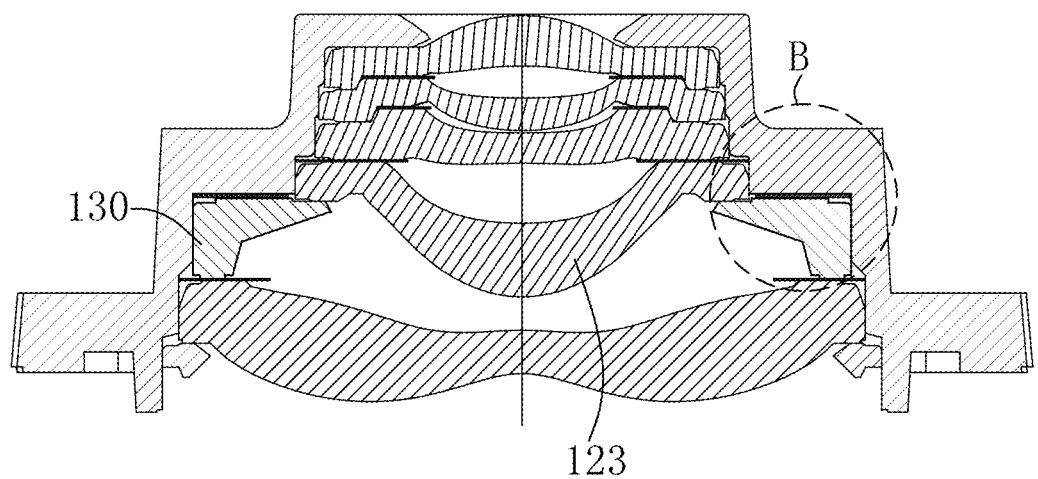
FIG. 3 is a structural diagram of a lens module according to another second embodiment of the present disclosure.
Figure 4:
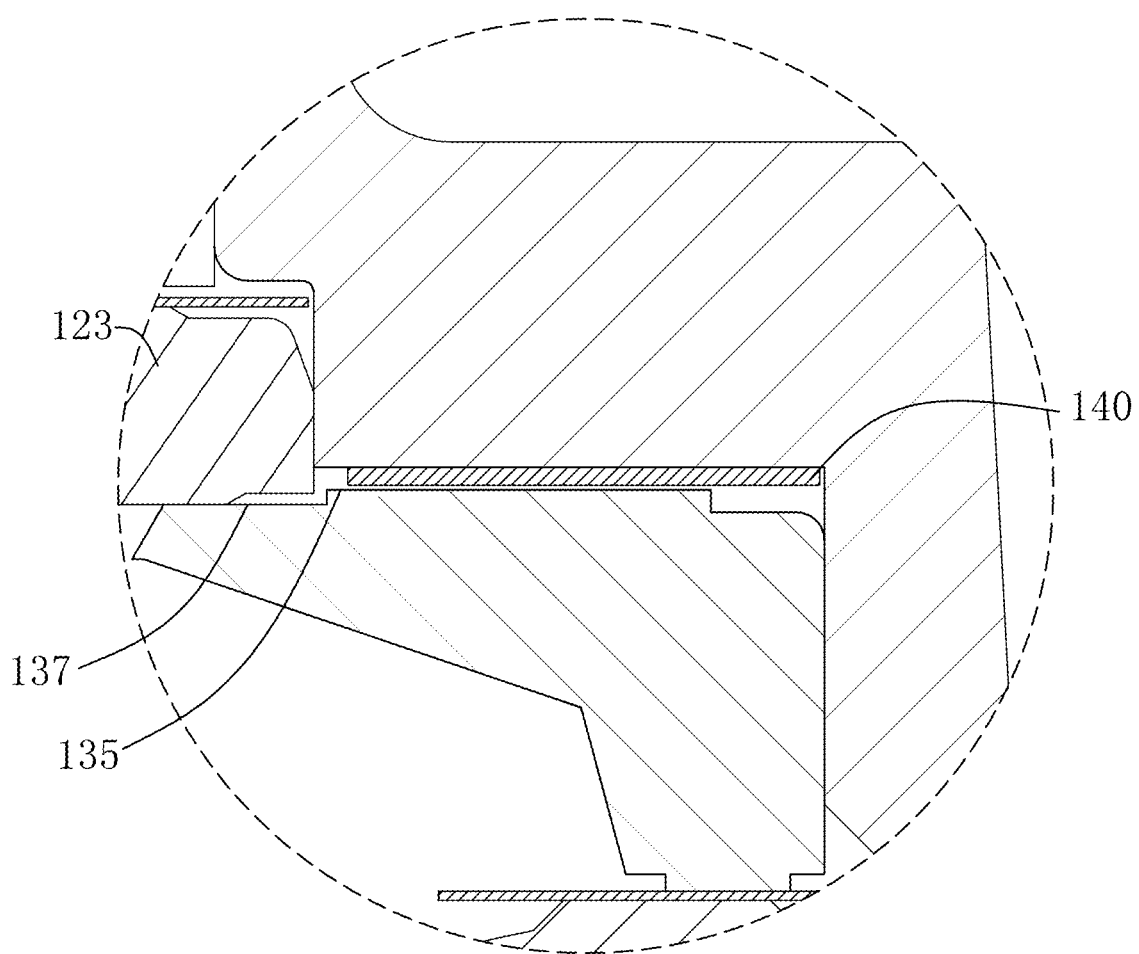
FIG. 4 is a partial enlarged view of area B shown in FIG. 3.

Referring to FIG. 3 and FIG. 4, the lens module 200 in this embodiment is substantially the same as the embodiment described with reference to FIGS. 1-2, except that:

in the present embodiment, the light shielding plate 130 further comprises a recessed portion 137 formed by recessing from the top surface 135 in a direction away from the object side, and the recessed portion 137 is located on a side adjacent to the optical axis.

The recessed portion 137 abuts against the image side surface of the second lens 123.

In the present embodiment, the recessed portion 137 is disposed on a side of the top surface 135 of the light shielding plate 130, such that a height difference is formed between the recessed portion 137 and the top surface 135, and the recessed portion 137 is configured to support the second lens 123, and the top surface 135 and the first light shielding sheet 140 are spaced apart from and opposite to each other.

It should be noted that the distance of the recessed portion 137 recessed from the top surface 135 in the direction away from the object side may be adjusted according to the thickness of the second lens 123, that is, the height difference between the recessed portion 137 and the top surface 135 could be adjusted according to the thickness of the second lens 123 such that the distance between the top surface 135 and the first light shielding sheet 140 is maintained between 0.001 mm and 0.02 mm. That is, when the thickness of the second lens 123 is big, the distance of the recessed portion 137 recessed from the top surface 135 is big, and when the thickness of the second lens 123 is small, the distance of the recessed portion 137 recessed from the top surface 135 is small.

Figure 5:
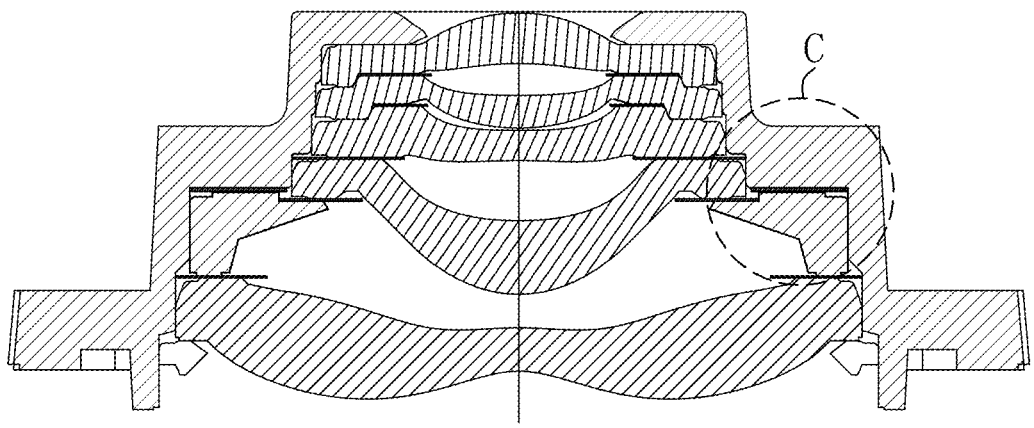
FIG. 5 is a structural diagram of a lens module according to yet another embodiment of the present disclosure.
Figure 6:
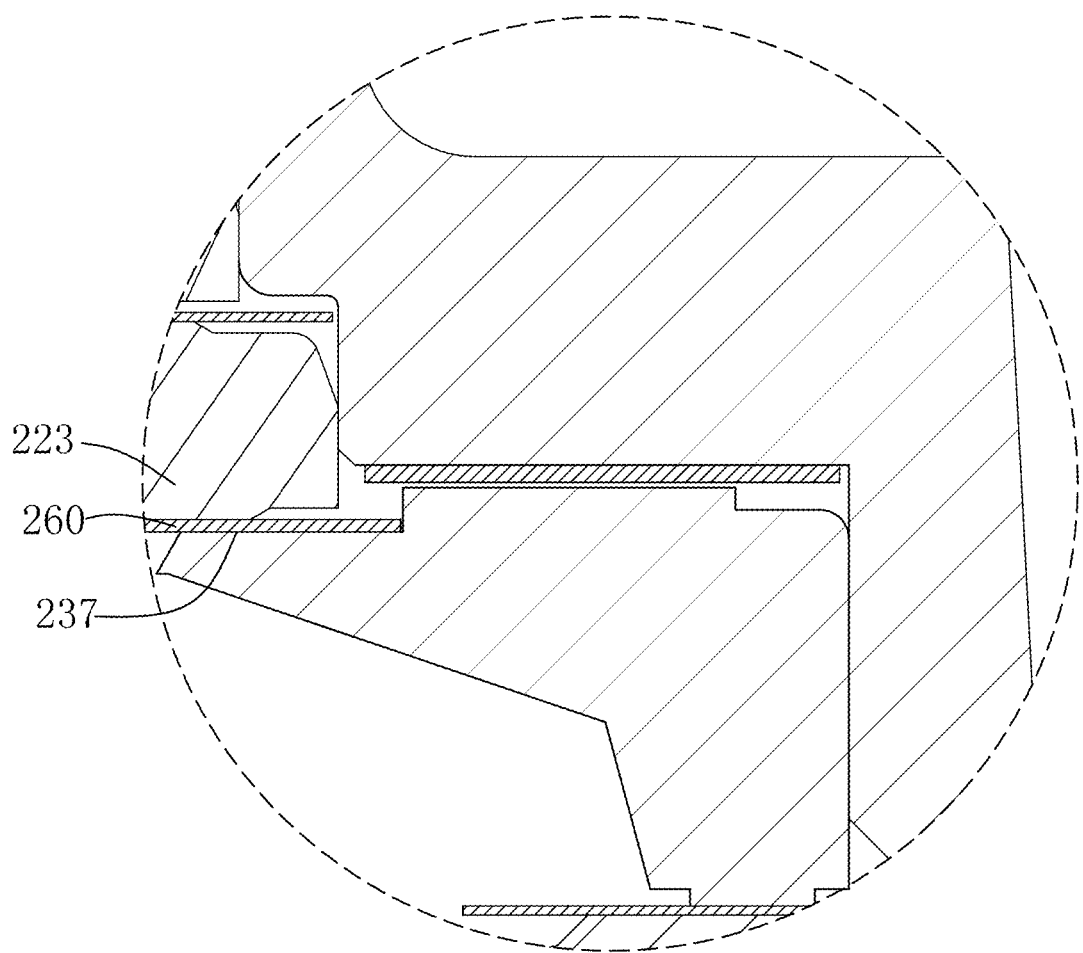
FIG. 6 is a partial enlarged view of area C shown in FIG. 5.

Referring to FIG. 5 and FIG. 6. the lens module 300 in this embodiment is substantially the same as the embodiment described with reference to FIGS. 3-4, except that:

this embodiment further comprises a second light shielding sheet 260 located between the second lens 223 and the recessed portion 237.

One side of the second light shielding sheet 260 abuts against an image side surface of the second lens 223, and the other side abuts against the recessed portion 237.

Specifically, a portion of the second light shielding sheet 260 abuts against the recessed portion 237, and another portion thereof extends out of the recessed portion 237 in an optical axis direction.

The second light shielding sheet 260 eliminates stray light, such that the lens module 300 has better optical performance.

Compared with the prior art, in the lens module of the present disclosure, the top surface of the light shielding plate partly supports the second lens, such that the second lens could be well held, and the light shielding plate, the second lens and the recessed portion jointly form the accommodation space, the first light shielding sheet is completely received in the accommodation space, and the first light shielding sheet could control the accommodation space in a better way: the accommodation space could be quickly adjusted by replacing the first light shielding sheet with different thicknesses, thereby achieving the purpose of controlling the gap between the first lens and the second lens, such that the gap between the first lens and the second lens would not change significantly, which improves the stability of the lens module.

The above is only embodiments of the present disclosure, and it should be noted that those skilled in the art can make improvements without departing from the concept of the present disclosure, but these improvements all fall in the protection range of the present disclosure.

What is claimed is:

1. A lens module comprising a lens barrel, and a lens group, a light shielding plate and a first light shielding sheet received in the lens barrel, wherein, the lens barrel comprises a first barrel wall with a light through hole and a second barrel wall crookedly extending from the first barrel wall, the first barrel wall and the second barrel wall forms a receiving space, the lens group comprises a first lens disposed away from the first barrel wall and a second lens located between the first lens and the first barrel wall, the light shielding plate is located between the first lens and the second lens, wherein, the second barrel wall comprises an annular groove provided in an inner wall thereof, the light shielding plate is partly received in the groove, the light shielding plate comprises a top surface adjacent to an object side, the top surface partly supports the second lens, the light shielding plate, the second lens and the groove jointly form an accommodation space, and the first light shielding sheet is completely received in the accommodation space.

2. The lens module according to claim 1, wherein the groove comprises a second surface perpendicular to an optical axis of the lens module and a first surface crookedly extending from an end of the second surface away from the optical axis in a direction away from the object side, the first light shielding sheet abuts against the second surface and is spaced apart from and opposite to the top surface.

3. The lens module according to claim 2, wherein an interval distance between the first light shielding sheet and the top surface is 0.001 mm to 0.02 mm.

4. The lens module according to claim 2, wherein the light shielding plate further comprises a recessed portion formed by recessing from the top surface in the direction away from the object side, the recessed portion is located on a side adjacent to the optical axis and is configured for supporting the second lens.

5. The lens module according to claim 4, wherein the recessed portion abuts against an image side surface of the second lens.

6. The lens module according to claim 4, wherein the lens module further comprises a second light shielding sheet sandwiched between an image side surface of the second lens and the recessed portion.

7. The lens module according to claim 4, wherein an interval distance between the first light shielding sheet and the top surface is 0.001 mm to 0.02 mm.

8. The lens module according to claim 5, wherein an interval distance between the first light shielding sheet and the top surface is 0.001 mm to 0.02 mm.

9. The lens module according to claim 6, wherein an interval distance between the first light shielding sheet and the top surface is 0.001 mm to 0.02 mm.

10. The lens module according to claim 2, wherein a third light shielding sheet is further provided between the light shielding plate and the first lens.

11. The lens module according to claim 8, wherein the light shielding plate further comprises a bottom surface opposite to the top surface, and the third light shielding sheet and the bottom surface abut against each other.

12. The lens module according to claim 2, wherein the first light shielding sheet is spaced apart from the first surface.

\* \* \* \* \*